July 11, 1967
W. S. CARSON
3,330,068
TREE TREATMENT APPARATUS AND METHOD
Filed April 5, 1965
5 Sheets-Sheet 2
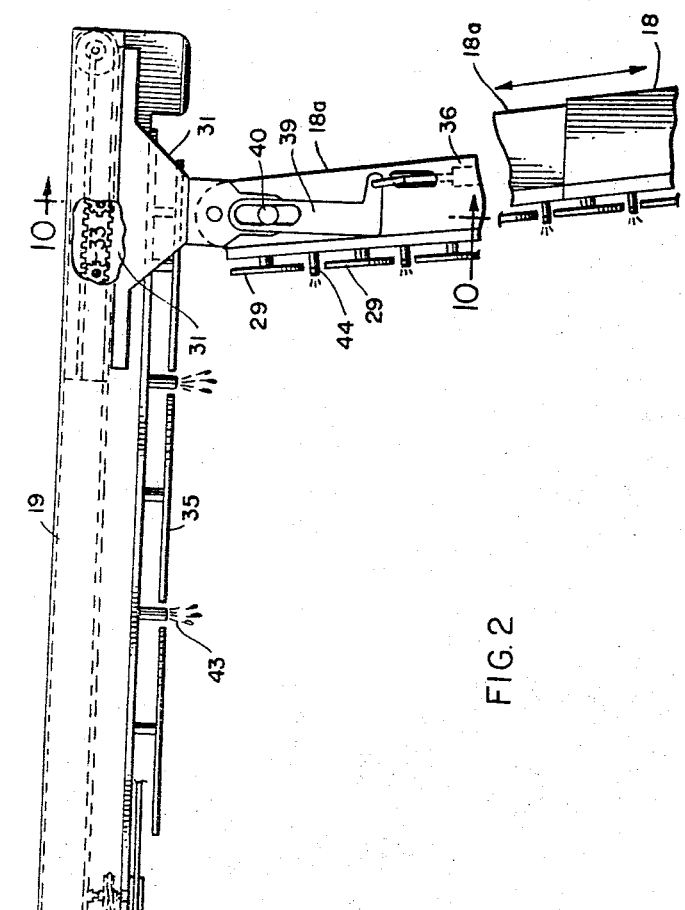
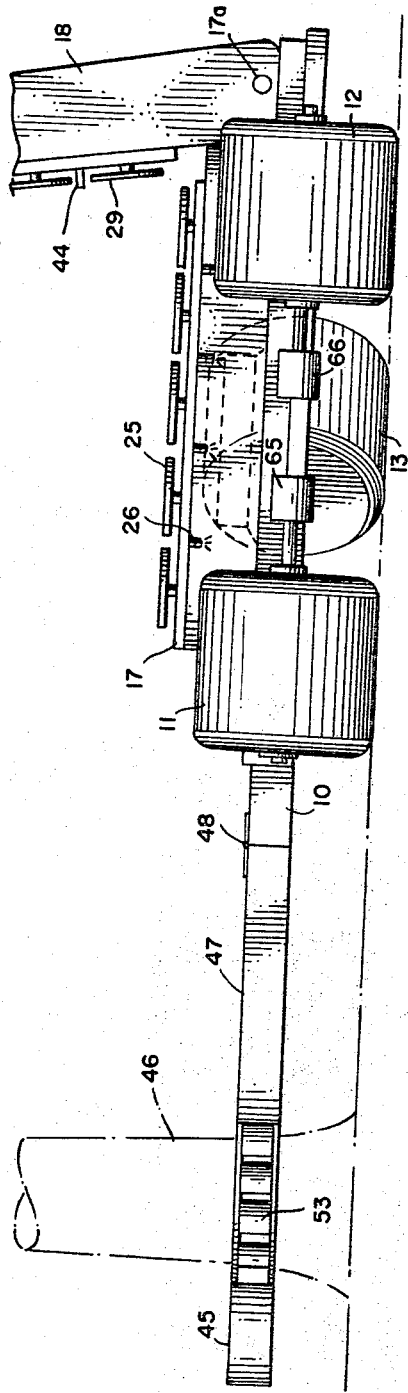
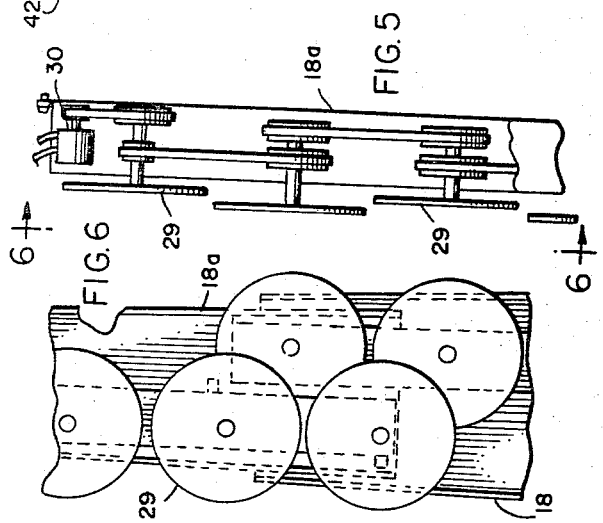
INVENTOR:
WILLIAM S. CARSON
BY
Dawson, Tilton, Fallon,
Lungmus & Alexander
ATT'YS

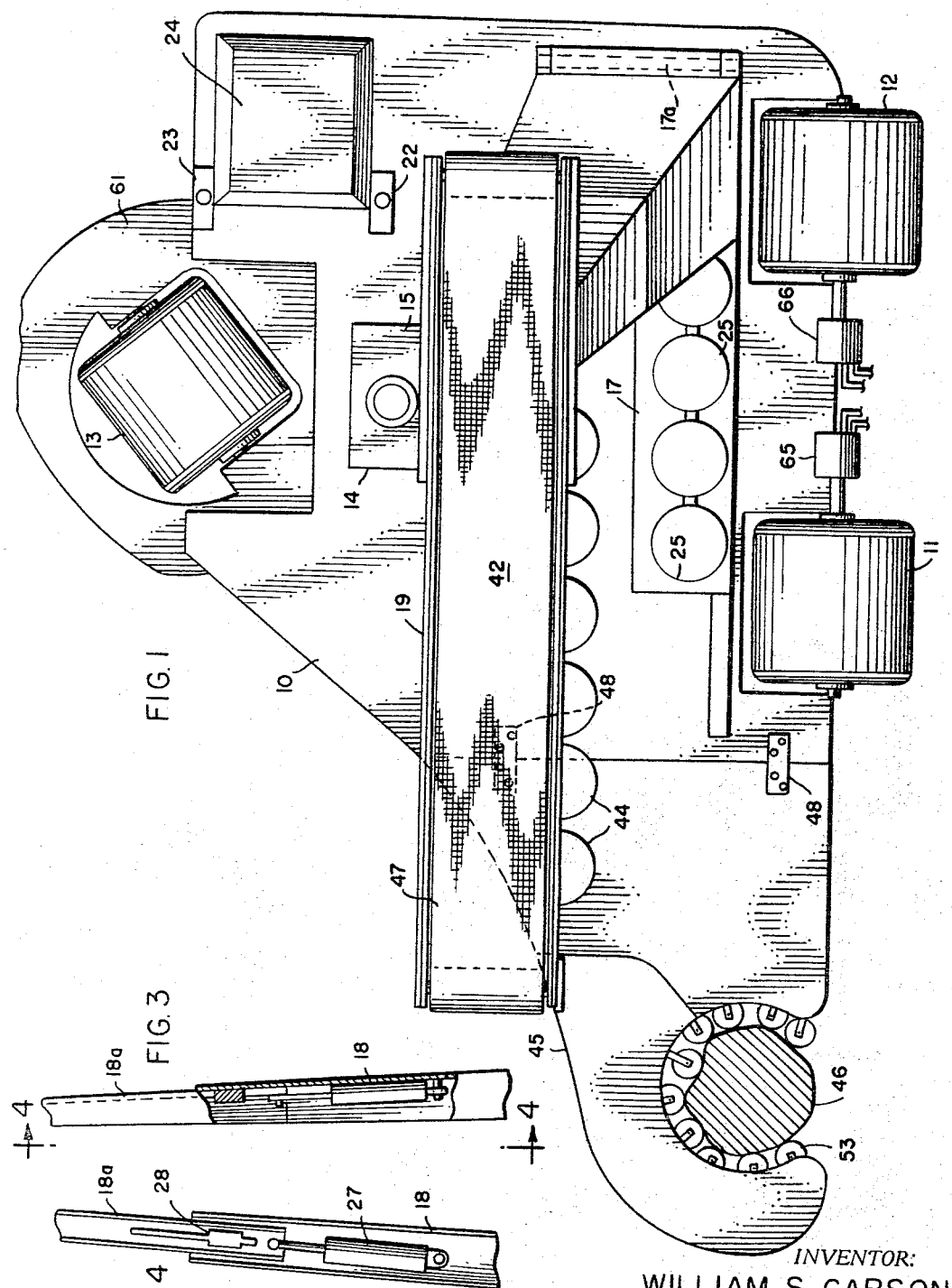

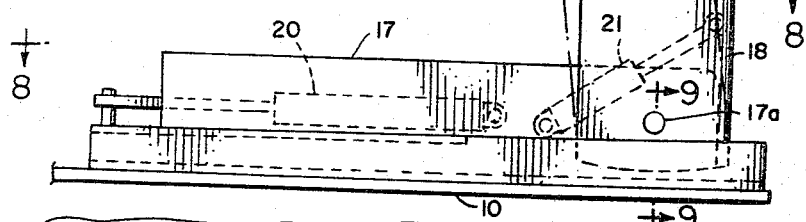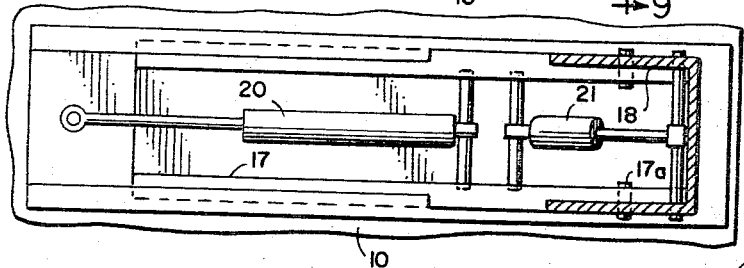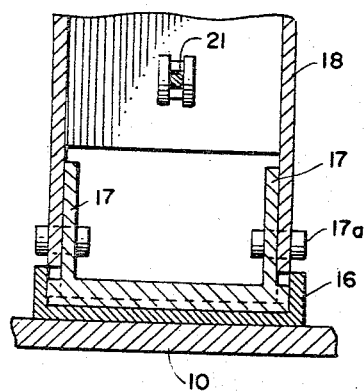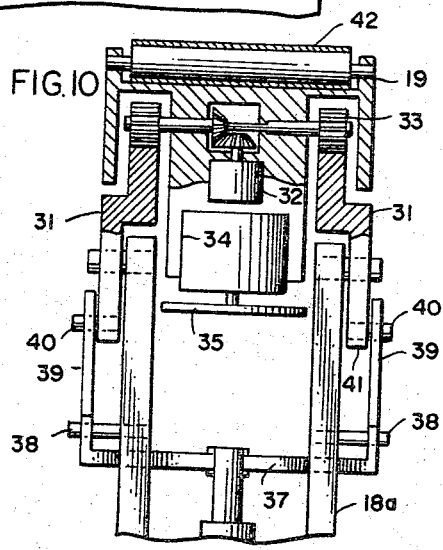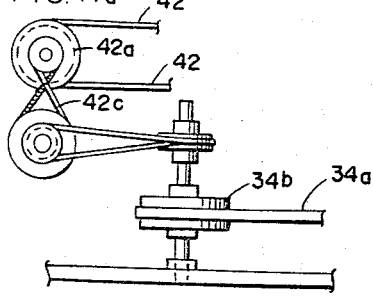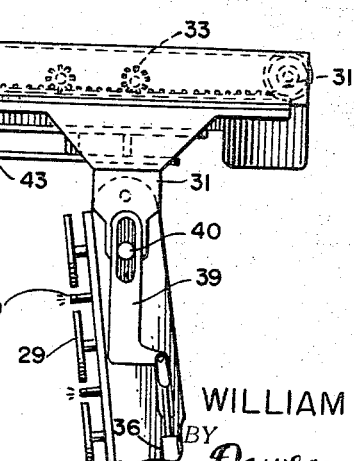

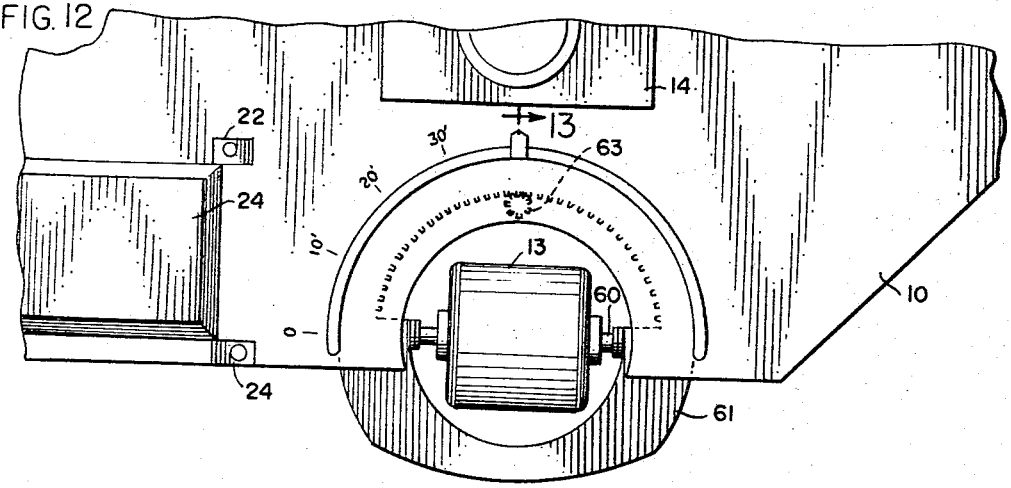
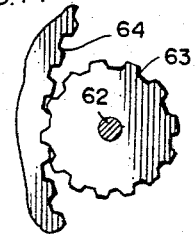
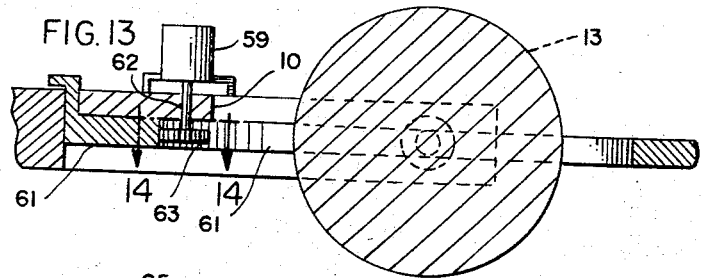
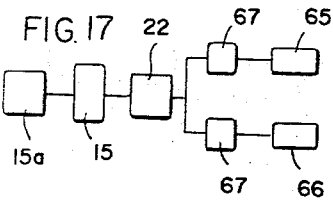
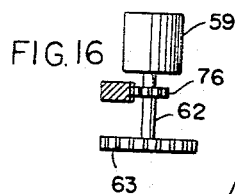
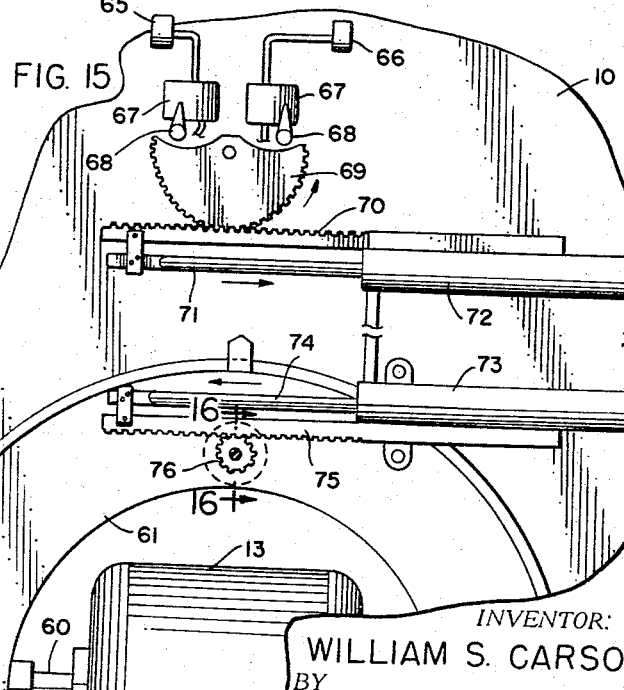
INVENTOR:
WILLIAM S. CARSON

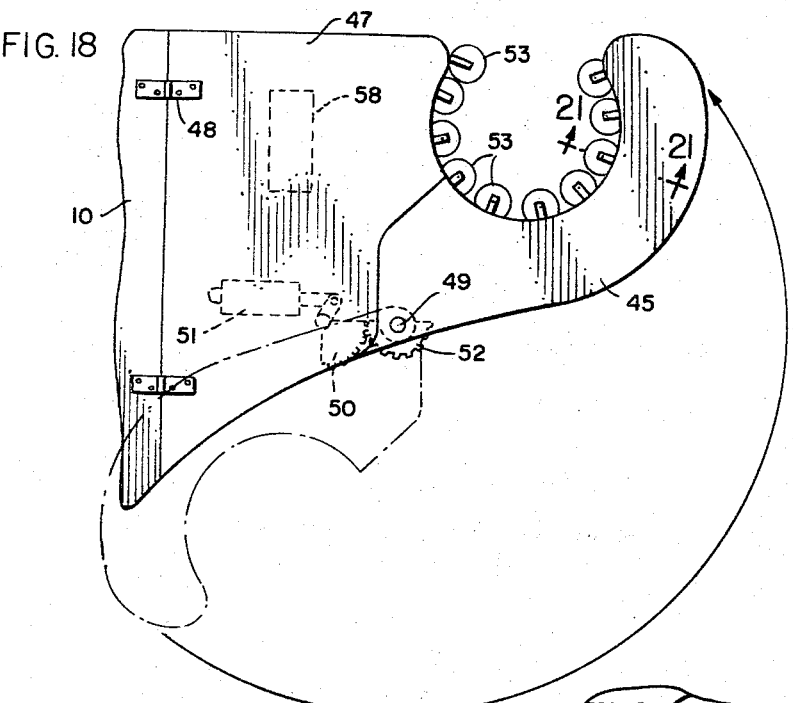
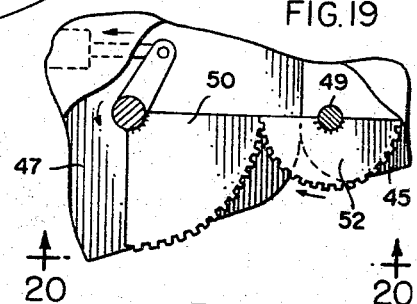
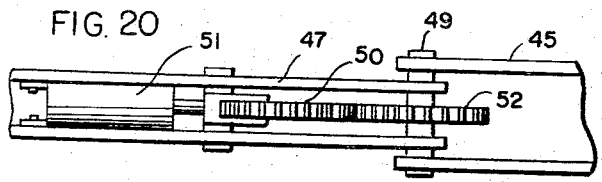
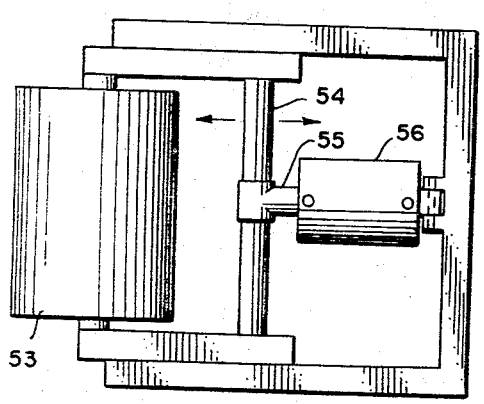
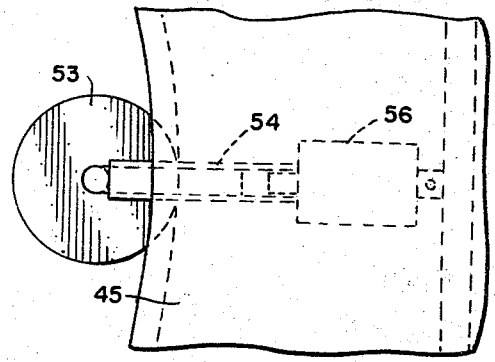
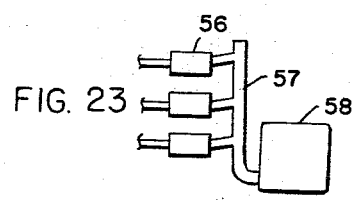
INVENTOR:
WILLIAM S. CARSON

# United States Patent Office 3,330,068
Patented July 11, 1967

3,330,068
TREE TREATMENT APPARATUS AND METHOD
William S. Carson, Lake Wales, Fla., assignor to Powermatic Corporation, a corporation of Florida
Filed Apr. 5, 1965, Ser. No. 445,445
8 Claims. (Cl. 47—1)

ABSTRACT OF THE DISCLOSURE

Apparatus for operating in a circle around a fruit tree with a boom carrying tree-treating devices, such as saws, spray means, trimming means, and fruit-picking means, power-driven wheels being provided for automatically steering the vehicle in a circular path, thus freeing the operator so that he can control the treating devices as the vehicle moves automatically at a fixed distance around the tree.

This invention relates to tree treatment apparatus and method, and more particularly to a machine for controlling the shape of the tree and treating it in the modified shape.

A primary object of the invention is to provide means for operating about a tree automatically in a prescribed circle and equipped with means for shaping and treating the tree. Yet another object is to provide in such apparatus means adapted to engage the trunk of a tree for maintaining the machine in the desired circle with respect to said tree trunk. A still further object is to provide a treating device and vehicle which can be set to operate around a tree by use of an offset wheel which will automatically steer the unit in a prescribed circle with the tree trunk as the center. A still further object is to provide such a vehicle with a hook device which can be attached to the trunk of a tree so as to provide stability of the vehicle during the treating operations on hillsides, uneven ground, or under any conditions where an offset wheel could not hold the desired circle of operation or where the vehicle is subject to tipping over. Yet another object is to provide such a machine and vehicle having an over, side and under tree boom assembly equipped with treating devices singly or in combination and which can be moved as a unit on a track in and out on a line from the center of the tree. A further object is to provide such a boom assembly which is fully adjustable to fit any size or shape of tree and which is able to shape a tree to any desired size and contour, utilizing a telescoping top and side boom and an angle-controlled top and side boom, movable as a unit on a track. A still further object is to provide in such vehicle or machine a top boom equipped with a conveyor which will carry severed brush out of the tree. Other specific objects and advantages will appear as the specification proceeds.

The invention is shown, in an illustrative embodiment, by the accompanying drawings, in which—

FIGURE 1 is a top plan view of apparatus embodying my invention; FIG. 2, a broken side view in elevation; FIG. 3, a broken detail view of a portion of the main boom; FIG. 4, a view of the structure shown in FIG. 3, the view being taken as indicated at line 4—4 of FIG. 3; FIG. 5, a detail view of a portion of the saw assembly which is mounted in the main boom shown in FIG. 2 on an enlarged scale and showing the mechanism for operating the saws; FIG. 6, a front view of the structure shown in FIG. 5, the view being taken as indicated at line 6—6; FIG. 7, a broken side view in elevation of the boom-supporting track; FIG. 8, a plan sectional view of the structure shown in FIG. 7, the section being taken as indicated at line 8—8 of FIG. 7; FIG. 9, a vertical sectional view of the structure shown in FIG. 8, the section being taken as indicated at line 9—9 of FIG. 8; FIG. 10, a detail sectional view on an enlarged scale, the section being taken as indicated at line 10—10 of FIG. 2; FIG. 11, a broken side view in elevation of the top boom and tilting mechanism therefor; FIG. 11A, a detail broken top plan view showing the drive for the top conveyor; FIG. 12, a broken plan detail view of the steering wheel shown in FIG. 1; FIG. 13, a sectional view, the section being taken as indicated at line 13—13 of FIG. 12; FIG. 14, an enlarged detail sectional view, the section being taken as indicated at line 14—14 of FIG. 13; FIG. 15, a broken plan view of the adjustable rear wheel and means for automatically slowing down the front drive which is nearest to the center of circle of travel; FIG. 16, a detail sectional view, the section being taken as indicated at line 16—16 of FIG. 15; FIG. 17, a diagrammatic layout of the tank, pump, main control valve, and the flow valves controlling the wheel motors; FIG. 18, a broken top plan view of the hook mechanism for engaging the trunk of a tree; FIG. 19, a broken enlarged plan view for showing the sector means for opening and closing the hook; FIG. 20, a detail sectional view, the section being taken as indicated at line 20—20 of FIG. 19; FIG. 21, an enlarged detail sectional view of the tree-engaging roller mechanism, the section being taken as indicated at line 21—21 of FIG. 18; FIG. 22, a top plan view of the tree-engaging roller mechanism; and FIG. 23, a diagrammatic view of the fluid system connecting the individual rollers and a hydraulic accumulator.

In the apparatus as shown best in FIGS. 1 and 2, I provide a vehicle body 10 having at the front thereof support rollers 11 and 12 and at the rear thereof a steering roller or wheel 13. For example, the metal platform 10 may be supported upon tires 11, 12 and 13 with high flotation characteristics, such as, for example 2 feet by 2 feet "Terra-Tires," and these are preferably arranged to support the platform about a foot off the ground so that the unit can operate under the tree.

For driving the vehicle, an engine 14 is provided which drives a hydraulic pump 15 at the side of the engine. For example, a 25-horsepower, air-cooled engine 14 driving a hydraulic pump 15 provides flexible power for cylinders which drive the wheels and attachments as well as the boom assembly, which will be later described. I prefer to have the unit driven by a hydrostatic drive, and it is satisfactory if the unit be moved around a tree at about walking speed.

Mounted upon the platform 10 is a track member 16 in which is slidably mounted a horizontal lower boom 17. Pivotally mounted upon the rear portion of the horizontal boom 17 is a vertical or main boom 18, and pivotally mounted upon the main boom 18 at the top thereof is a top boom 19. As shown best in FIGS. 7, 8 and 9, the bottom horizontal boom 17 is provided with a pivot 17a upon which the main boom 18 may be angularly moved. Hydraulic cylinder means indicated by the numeral 20 are provided for drawing the horizontal boom 17 inwardly and outwardly in a horizontal plane, and hydraulic cylinder means 21 are provided for moving the main boom 18 angularly upon pivot 17a. The movement of the cylinders 20 and 21, as well as other cylinders which will be described, is controlled by hydraulic valves operated by control boxes 22 and 23 on each side of the driver's seat 24, the control valves being operated by levers, etc., with which the boxes are provided. Since such control mechanism is well known, a further detail description herein is believed unnecessary.

The lower boom 17 may be provided with saws 25 for cutting off lower branches of the tree so as to maintain a desired clearance below the tree. In addition, spray devices 26, as shown best in FIG. 2, may be provided for discharging weed-destroying liquid, liquid fertilizer, or other material for treating the lower portion of the tree or the ground thereunder. If desired, the spray nozzles 26 may be replaced with spinners for distributing powdered fertilizer upon the ground. It will be understood that various treating means may be substituted for those shown, which are merely illustrative of known treating devices for treating soil, etc.

The vertical main boom 18 is provided with an upper telescoping part 18a, and hydraulic cylinder means 27 and 28 are provided for sliding the booms upwardly and downwardly. The booms are also provided with saws 29 mounted on shafts with pulleys which are driven by a fluid motor 30, as shown in FIG. 5, or by other suitable means. It will be understood that in place of saws, sickles or other trimming mechanism may be employed. Ordinarily, after a tree has been shaped by using saws for making the heavy cuts, a sickle bar assembly or the like may be used for a number of years for trimming back the new growth so as to give the desired shape to the tree.

Mounted upon the top of the boom 18a is a track member 31, and movably mounted upon the track member 31 is the top boom 19. As shown best in FIG. 10, a fluid motor 32 drives through gears, the side gears 33 meshing with the teeth of the track 31 so that in this manner the top boom 19 may be advanced or retracted upon the track 31. Supported in the top boom 19 are the fluid motors 34 which drive through bolts and pulleys the horizontal saw assembly 35.

I provide means for tilting the top boom 19 upon the boom 18a, as shown best in FIGS. 2 and 10. A power cylinder 36 moves the bar 37 on the fixed pivots 38 carried by the boom 18a so that the upper slotted end of the lever 39 moves the pin 40 connected to the depending portion 41 of track 31.

It is of considerable importance that the branches which are severed from the tree be promptly removed from the tree in order not to interfere with further trimming operations and to prevent decay in trees, and to this end I provide (see FIGS. 11 and 11A) the upper portion of the boom 19 with a conveyor 42 which may consist of a rubber belt mounted on rollers 42a, one of which is driven by a take-off belt 42c from the drive for the saw assembly 35.

The top boom may be provided with spray nozzles 43 for discharging liquid fertilizer, insecticides or bactericides, etc., or for other treating of the shaped top portion of the tree. Similarly, the boom portions 18 and 18a may be provided with nozzles 44 or the like for similar purposes. The nozzles 43 and 44 are merely illustrative of a variety of treating devices which may be used and which now become extremely effective because of the pre-shaping of the tree. After a tree or series of trees have been shaped to a pre-determined size and contour, it will be understood that the apparatus herein may be utilized rapidly, singly or in combination, for treating each tree, both as to the top, sides and bottom, through the movement of the vehicle device around each tree, or, if desired, in a straight line along each tree row by setting the rear wheel for straight travel. I prefer to rotate the vehicle around the tree so as to give complete uniform coverage with the treating material.

By pre-setting or locking in position the steering tire or wheel 13, as, for example, in the position shown in FIG. 1, the treating vehicle may be caused to move in a prescribed circle around the tree for the purposes which have been outlined. However, in some instances, this may not be practicable because the trees are located on hillsides or uneven ground and there is danger of the vehicle tipping. For this situation, I provide a hook device 45 adapted to engage a tree trunk which is indicated by the numeral 46, as shown in FIG. 1. The hook 45 is supported upon a plate member 47 supported by hinges 48 upon the platform 10, and the hook portion 45, as shown best in FIGS. 18 to 22, is mounted on a vertical pivot 49 on the plate structure 47 and is operated by sector members 50 operated by power cylinder 51. Fixed to the pivot 49 is a gear 52 meshing with the sector lever 50. By this means, the hook 45 can be opened readily to disengage it from the tree trunk or to bring it into engagement with the tree trunk 46. The entire assembly can be folded up on hinges 48 for compact travel or taken off completely, or the hook left in retracted position.

Since a tree trunk may be quite irregular in shape and in order to prevent damaging the tree trunk, I provide a plurality of rubber rolleres 53, each mounted on a yoke 54 having a piston arm 55 engaging a piston within a cylinder 56. Communicating with each cylinder 56, as shown in FIG. 23, is a manifold 57 communicating with a hydraulic accumulator tank 58. With this arrangement, each roller will have the same outward pressure exerted on it from the accumulator regardless of its in or out position. Thus, as the vehicle moves around the tree, each individual roller will roll in and out of the high and low points on the tree trunk and yet maintain a nearly constant circle when taken as a group, making up a large circle.

Under many circumstances, the rear steering wheel 13, which is preferably driven by a motor 59, will be sufficient to maintain the vehicle in the desired circular path about the tree when the steering wheel is moved to the position shown in FIG. 1. When the vehicle is to be moved in a straight path, the wheel 13 may be swung to the position shown in FIG. 12. The wheel 13 is mounted upon a shaft 60 rotatably supported in the plate member 61. The motor 59 drives a shaft 62 extending through the platform 10, and the shaft 62 is provided with a gear 63 meshing with an inner circular rack 64 carried by the member 61. Thus, by valve control means, power can be supplied to the motor 59 for driving the shaft 62 in either direction and for rotating the support plate 61 to the desired position and for normal steering duties.

To further assist the vehicle in maintaining a constant circle when the rear wheel is set by the operator, the inner front wheel may be slowed down in relation to the outer front drive wheel, thus causing each wheel to drive in its own circle. This structure is illustrated in FIGS. 15 and 16. In the drawing, 65 indicates the left wheel motor and 66 indicates the right wheel motor; 67 indicates each of the flow control valves; and 68, the flow-controlling handle. A gear 69 meshes with a rack 70 secured to a piston rod 71 equipped with a piston in cylinder 72, and the cylinder 72 is connected with a twin cylinder 73 equipped with a like piston-equipped rod 74. The rod 74 is connected with a ratchet arm 75 meshing with gear 76. The gear 76 works the speed control mechanism and is mounted on shaft 62 equipped with a lower gear 63 which turns the wheel-supporting plate 61. It will be understood that any suitable mechanism for slowing down the innermost wheel which is nearest to the center of the circle of travel may be employed to assist the steering wheel 13 in keeping the vehicle in a prescribed circle about the tree.

In the full diagram shown in FIG. 17, 15 designates a pump driven by motor 14, and 15a designates a tank, while the main control valve is indicated by the numeral 22, this valve or series of valves being operated by a lever or "joy stick," etc., and the flow from the control valves is to the flow control valves 67, as shown in FIG.

15, and the flow from the control valves is to the wheel motors 65 and 66.

Operation

In the operation of the apparatus, the vehicle is brought to a position adjacent to and under the tree, and the steering wheel 13 may then be pre-set to form a pre-scribed circle around the tree. If desired, the hook 45 may be brought around the tree trunk for engagement therewith. Whether the hook is employed or not, the pre-setting of the apparatus is such that the vehicle drives automatically in a circle about the tree so that the operator is completely free to operate the boom mechanism for shaping the bottom, sides and top of the tree to a pre-determined size and contour. If the tree is already shaped, the boom mechanism may be employed with the treating devices for treating the ground below the tree, as by fertilizing the ground, or killing the weeds, or cutting the weeds, etc., while the sides of the tree may be sprayed with insecticides, bactericide, liquid fertilizer, etc., and similarly the top of the tree may be treated directly by treating mechanism brought adjacent to the outer surfaces of the tree where treatment is most critical and needed. Since the movement of the vehicle itself is automatic, either circular or straight line, and requires no attention from the operator for steering, his full energies can be given to the treatment of the tree surfaces, including bottom, side and top surfaces and the ground below. After the treatment of a tree, the steering motor 49 can be activated to move the plate 61 in a rotary direction to carry the wheel 13 into a position parallel with the two rollers 11 and 12, and the device may then be advanced to the next tree.

The center of gravity of the vehicle is centered in the middle of the unit so as to provide stability. This is done by angling the main boom back and in and by counter-balancing the top boom. By moving the bottom boom 17 inwardly and outwardly upon the base track 16, the operator can follow the contours of a tree and shape the tree to any desired configuration. A tree can be circular, elliptical, or even square, with straight or angled sides and flat or angled tops. If the driver encounters an irregular tree shape, such as one with a concave side, he can hedge this surface also by moving the boom assembly in and out of the depression as he passes it.

In the treating operation, after a row of trees has been trimmed to a desired shape and contour, the device may be moved around each tree, performing all of the treating operations, both under the tree, along the sides of the tree, and on the top of the tree simultaneously. If desired, a hoe, chopper, or other implement may be used instead of the sprayer shown to work the important ground area under the tree.

A further advantage arising in the preshaping of a tree in size and contour is that an automatic picker may be employed to follow in the sequence illustrated by the apparatus here shown, with the picking mechanism closely conforming to the outer surfaces of the tree which support the fruit.

The conveyor at the top of the top boom serves the very important function of removing brush as it is severed, thus not only removing the brush away from the cutting devices, but also discharging the same into the rows opposite the trees where it can readily be collected and removed.

While in the foregoing specification I have set out specific means for maintaining the tree treating boom in a path around the tree, it will be understood that various other means may be utilized for this purpose. For example, instead of using a hook device, as described herein, one may use a circular track which has segments which telescope within each other and is provided with wheels for drawing it along a row and into positions about a tree, the boom unit being provided with power means for moving it on the segmental telescoping tracks. It will be understood that any suitable means may be provided for guiding the treating mechanism in the desired circular path.

The entire hook mechanism 47 may be employed to telescope in and out toward the tree if desired. It will be noted that the offsetting of the saws 29, as illustrated best in FIG. 5, permits telescoping of the boom parts.

While in the foregoing specification I have shown embodiments of the invention in considerable detail for the purpose of illustrating the invention, it will be understood that such detail or details may be varied widely by those skilled in the art without departing from the spirit of my invention.

I claim:

1. In apparatus for treating a tree having a trunk carrying outwardly-extending limbs, in which apparatus a motor-driven vehicle has front and rear wheel-equipped axles and supports a vertically-extending boom equipped with tree-treating devices, said boom with said devices being movably mounted and power operated for positioning the devices alongside said limbs, the improvements which comprise a rotatably-mounted support for one of said axles, and means for releasably locking said last-mentioned axle in radial alignment with said tree trunk for automatically holding said vehicle in a circular path and at a fixed distance from said tree, whereby the operator of the vehicle is free to control the operation of said treating devices as the vehicle moves in said path.

2. The apparatus of claim 1 in which the vehicle comprises a platform supported at one end by a wheel-equipped drive axle radially aligned with said tree trunk and supported at the other end by a steering wheel carried by said rotatably-mounted support, said steering wheel axle being also radially aligned with said tree trunk but being movable into a position parallel with said driven axle for straight-line movement of the vehicle.

3. In apparatus for the treating of a fruit tree having its trunk supporting fruit-bearing limbs, in which apparatus a motor-driven vehicle has front and rear wheel-equipped axles and supports a vertically-extending boom equipped with tree treating devices, said boom with said devices being movably mounted and power operated for positioning the devices alongside said limbs, the improvements which comprise a platform extending between said front and rear axles and supporting said boom, one of said axles being a drive axle and being aligned radially with said tree trunk, and the other of said axles being a steering wheel axle, an arcuate plate support for said steering wheel axle, a steering wheel mounted on said axle, means for moving said arcuate support to bring the axle thereof into a selected position radially aligned with said trunk for automatically maintaining the vehicle in a fixed circular path at a fixed distance from said tree trunk, and means for releasably locking said arcuate support in said selected position.

4. The structure of claim 3 in which means are provided for reducing the speed of one of said wheels on said drive axle adjacent said tree trunk when the axle of said steering wheel is moved to said selected radial position.

5. The structure of claim 3 in which power means is provided for rotating said arcuate steering wheel support.

6. In apparatus for treating a tree having a trunk carrying outwardly-extending limbs, in which apparatus a motor-driven vehicle has front and rear wheel-equipped axles and supports a vertically-extending boom with tree-treating devices, said boom with said devices being movably mounted and power operated for positioning the devices alongside said limbs, the improvements which comprise a platform on which said boom is mounted and having its front end supported by one of said axles which is radially aligned with said trunk and having its other end supported by a steering wheel mounted on an axle supported by the platform for movement into and out of a position radially aligned with said trunk, means for releasably securing said axle in a selected position radially aligned with said trunk for automatically maintaining said vehicle in a circular path at a fixed distance from the tree trunk, and means for releasing said last-mentioned axle from said selected radial position and moving the same into a position parallel with the other axle for straight-line movement of the vehicle.

7. The structure of claim 6 in which the wheels support said platform close to the ground whereby the major portion of the platform may move freely under said tree limbs.

8. The structure of claim 7 in which a member fixed to said platform extends laterally toward said tree trunk as a guide for aligning an axle of said vehicle radially with said tree trunk.

References Cited

UNITED STATES PATENTS

| | | | |
|---|---|---|---|
| 1,602,357 | 10/1926 | Georgelis | 143—43 |
| 2,514,766 | 7/1950 | Judd | 172—24 |
| 2,651,249 | 9/1953 | Morkoski | 172—24 |
| 3,127,725 | 4/1964 | Richardson | 56—328 |
| 3,253,392 | 5/1966 | Barrat | 56—328 |

ABRAHAM G. STONE, *Primary Examiner.*

ROBERT E. BAGWILL, *Examiner.*